(12) United States Patent
Pruski

(10) Patent No.: US 6,785,234 B1
(45) Date of Patent: Aug. 31, 2004

(54) METHOD AND APPARATUS FOR PROVIDING USER CONTROL OF AUDIO QUALITY

(75) Inventor: Kenneth P. Pruski, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/470,657

(22) Filed: Dec. 22, 1999

(51) Int. Cl.[7] .......................... G06F 11/00; G06F 15/16
(52) U.S. Cl. ...................... 370/231; 709/217; 709/233
(58) Field of Search ................................ 370/230–234, 370/252, 410, 412, 477, 508, 516, 517, 519, 522, 468, 260, 267; 709/233, 224, 214, 231, 237, 221, 235; 704/243; 379/93.01, 68, 93.15, 202.07, 88.11; 714/751, 752; 725/18; 340/825.25; 348/553

(56) References Cited

U.S. PATENT DOCUMENTS

| | | | | |
|---|---|---|---|---|
| 4,359,603 A | * | 11/1982 | Heaton ........................ | 370/267 |
| 4,716,585 A | * | 12/1987 | Tompkins et al. ...... | 379/202.01 |
| 5,018,136 A | * | 5/1991 | Gollub ........................ | 370/477 |
| 5,193,151 A | * | 3/1993 | Jain ............................ | 709/235 |
| 5,533,112 A | * | 7/1996 | Danneels .................... | 370/260 |
| 5,642,428 A | * | 6/1997 | Nowack ....................... | 379/68 |
| 5,651,054 A | * | 7/1997 | Dunn et al. ............... | 379/88.11 |
| 5,822,537 A | * | 10/1998 | Katseff et al. ............... | 370/231 |
| 5,844,979 A | * | 12/1998 | Raniere et al. ............. | 370/260 |
| 5,940,479 A | * | 8/1999 | Guy et al. ................ | 379/93.01 |
| 6,105,064 A | * | 8/2000 | Davis et al. ................ | 709/224 |
| 6,178,237 B1 | * | 1/2001 | Horn ...................... | 379/202.01 |
| 6,215,769 B1 | * | 4/2001 | Ghani et al. ................ | 370/230 |
| 6,230,190 B1 | * | 5/2001 | Edmonds et al. ........... | 709/213 |
| 6,241,612 B1 | * | 6/2001 | Heredia ........................ | 725/18 |
| 6,243,676 B1 | * | 6/2001 | Witteman .................... | 704/243 |
| 6,301,258 B1 | * | 10/2001 | Katseff et al. .............. | 370/517 |
| 6,411,335 B1 | * | 6/2002 | Jang ........................... | 348/553 |
| 6,421,720 B2 | * | 7/2002 | Fitzgerald ................... | 709/224 |
| 6,434,606 B1 | * | 8/2002 | Borella et al. .............. | 709/231 |
| 6,452,950 B1 | * | 9/2002 | Ohlsson et al. ............. | 370/519 |
| 6,487,603 B1 | * | 11/2002 | Schuster et al. ............ | 370/252 |
| 6,580,694 B1 | * | 6/2003 | Baker ......................... | 370/252 |
| 2002/0163439 A1 | * | 11/2002 | Attimont et al. ....... | 340/825.25 |

OTHER PUBLICATIONS

"System Description for the Cisco Communications Network Version 2.1", Cisco Systems, Inc., pp. i–v and 1–36, Jan., 1999.

* cited by examiner

*Primary Examiner*—Duc Ho
*Assistant Examiner*—Phuongchau Ba Nguyen
(74) *Attorney, Agent, or Firm*—Baker Botts L.L.P.

(57) ABSTRACT

A system (10) provides a user of a communication device with the ability to control an audio quality of the audible sound generated by the communication device, and includes several telephones (30–32) coupled to a communication network (20) of the type through which computers (35–36) can communicate. The telephones exchange electrical communications that represent audible sounds. Each telephone has the ability to either increase or decrease an audio quality of the audible sound generated by that telephone in response to manual activation of a respective one of two buttons (76–77). Upon activation of one such button (76), the telephone can facilitate an increase in the audio quality by signaling another telephone to decrease the size of electrical communications being sent through the communication network, and/or by buffering the audio information in successive electrical communications before beginning to convert the audio information into audible sound.

49 Claims, 3 Drawing Sheets

METHOD AND APPARATUS FOR PROVIDING USER CONTROL OF AUDIO QUALITY

TECHNICAL FIELD OF THE INVENTION

This invention relates to communications and, more particularly, to communications through electrical communication networks.

BACKGROUND OF THE INVENTION

Telephones, and other communication devices, for exchanging electrical communications of audio information through a public switched telephone network (PSTN), have existed for a substantial time and are well understood. Recently, however, telephones have been created that exchange electrical communications of audio information through packet switched networks of the type which computers use to communicate with each other. These telephones use a digitized format that is broken down into discrete message units to represent audible sound. These message units are sent and received through the packet switched network.

Unfortunately, exchanging electrical communications of audio information through a packet switched network presents a variety of problems. For example, when a string of audible sounds, such as a long sentence, is broken into several message units and sent through the packet switched network, some of the message units may not traverse the packet switched network at the same rate. Thus, the audible sounds represented by a first message unit could be transformed into audible sounds at a receiving telephone before the next message unit is received, resulting in a gap in the audible sounds that is at least irritating, if not unintelligible, to the user.

SUMMARY OF THE INVENTION

From the foregoing, it may be appreciated that a need has arisen for a method and apparatus for providing a user of a communication device with the ability to control an audio quality of the audible sound generated by the communication device.

According to one form of the present invention, a method and apparatus are provided to address this need, and involve receiving in a communication device electrical communications of audio information that are in a digital format and generating audible sound based on the audio information. The method also includes detecting a user request for a change in an audio quality of the audible sound and responding to detection of the request by facilitating the change in the audio quality of the audible sound.

Another form of the invention involves the provision of a processor, a transceiver, an audio input device, an audio output device, and a user operable input device. The transceiver is coupled to the processor and is operable to receive and send electrical communications of audio information. The audio input device is coupled to the transceiver and is operable to receive audible sound and convert it into electrical communications. The audio output device is also coupled to the transceiver and is operable to generate audible sound based on the audio information in received electrical communications. The user operable input device is coupled to the processor and is operable to instruct the processor to facilitate a change in an audio quality of the audible sound from the audio output device.

BRIEF DESCRIPTION OF THE DRAWINGS

For a more complete understanding of the present invention, and for further features and advantages, reference is now made to the following description taken in conjunction with the accompanying drawings, in which.

DETAILED DESCRIPTION OF THE INVENTION

Figure 1:
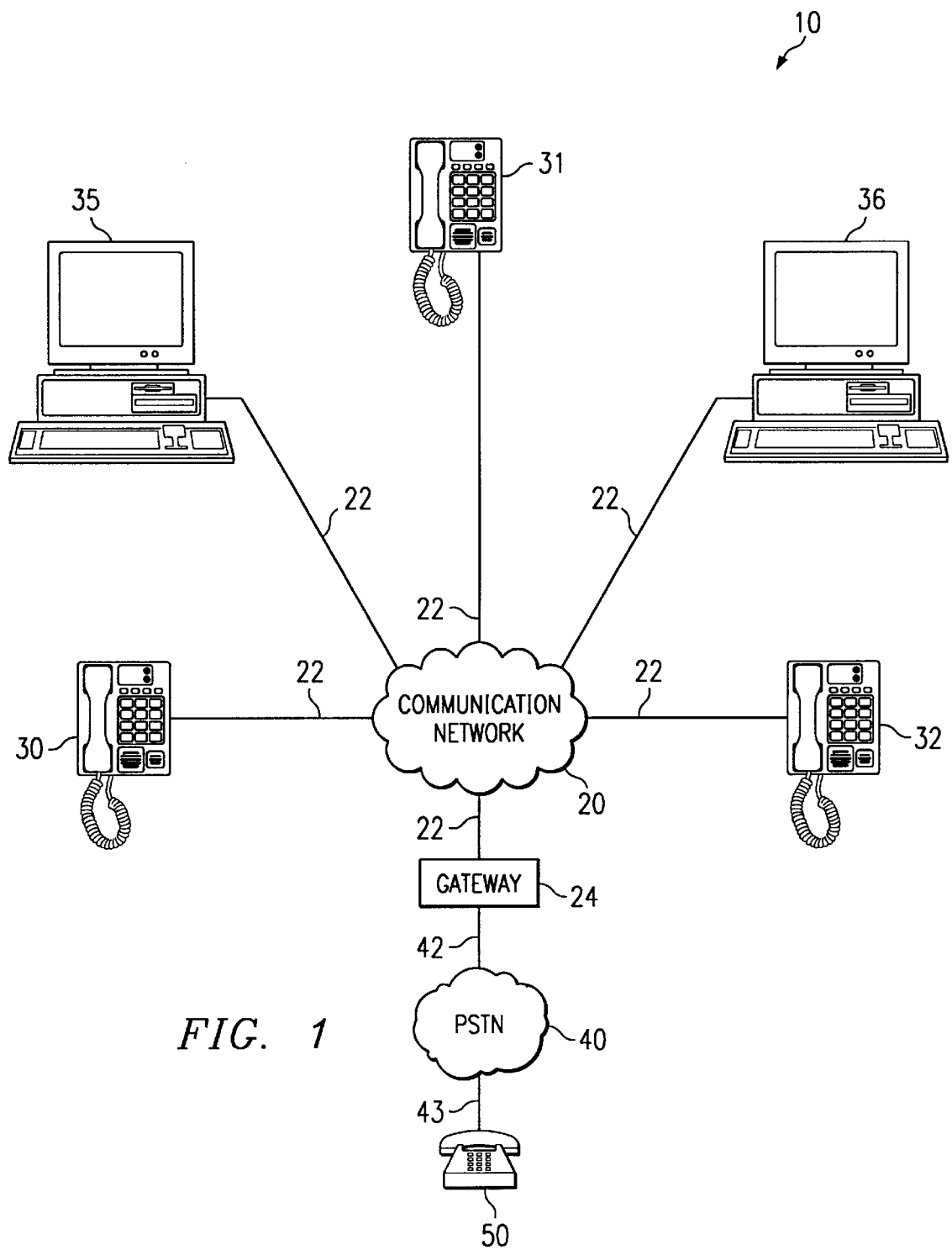
FIG. 1 is a diagrammatic view of a system that embodies the invention.

FIG. 1 is a diagrammatic view of a system 10 that embodies the invention. System 10 includes a communication network 20, which is of a known type commonly used to transfer electrical signals. For the disclosed embodiment, communication network 20 is a network of the type commonly known in the industry as an Ethernet network, but could be some other type of digital or analog communication network in other embodiments.

System 10 also includes a plurality of telephones, three of which are shown at 30–32. Each telephone 30–32, which is a type of communication device, is coupled to communication network 20 through one of several communication links 22. Telephones 30–32 are capable of exchanging electrical communications of audio information representing audible sounds through communication network 20, instead of through a traditional public telephone network. Telephones 30–32 can communicate with each other to establish communication parameters for use in exchanging electrical communications through communication network 20 using any of a variety of signaling techniques known in the industry, such as the real time protocol (RTP) signaling technique. The RTP technique is known to those skilled in the art, and is therefore not described here in detail. Although only three telephones are shown for the disclosed embodiment, any number of telephones may be coupled to communication network 20.

System 10 further includes several computers, two of which are shown at 35–36. Each computer 35–36 is also coupled to communication network 20 through one of the communication links 22. Computers 35–36 can exchange information across communication network 20 in a manner well known in the industry. Computers 35–36 could be omitted for purposes of the present invention, but are included in FIG. 1 in order to emphasize that communication network 20 can be concurrently used for several compatible functions.

System 10 additionally includes a gateway 24, a public switched telephone network (PSTN) 40, and a PSTN telephone 50, which a type of PSTN communication device. Gateway 24 is coupled to communication network 20 through one of the communication links 22 and to PSTN 40 through a PSTN link 42. PSTN telephone 50 is coupled to PSTN 40 through a PSTN link 43. PSTN telephone 50 can exchange electrical communications of audio information with telephones 30–32.

Figure 2:
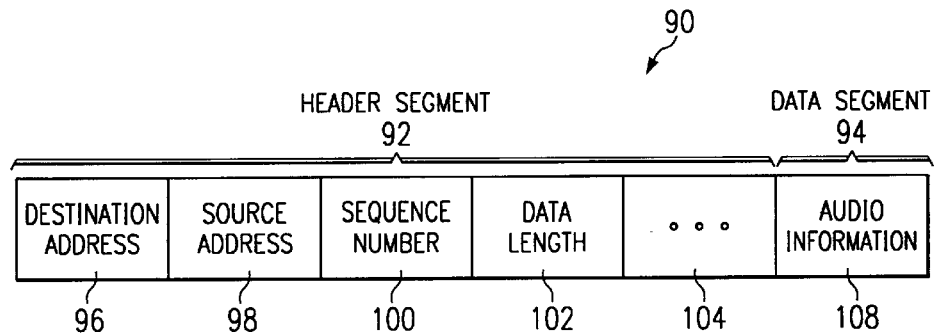
FIG. 2 is a diagrammatic view of an Ethernet packet for use in a communication network which is a component of the embodiment of FIG. 1.

FIG. 2 is a diagrammatic view of an Ethernet packet 90 for use in communication network 20 in the disclosed embodiment. Ethernet packet 90 includes a header segment 92 and a data segment 94. Header segment 92 includes a destination address section 96, a source address section 98, a sequence number section 100, a data length section 102, and various other sections 104. Destination address section 96 contains information indicating which one of telephones 30–32, computers 35–36, or gateway 24 is to receive Ethernet packet 90. Source address section 98, in turn, contains information indicating which one of telephones 30–32, computers 35–36, or gateway 24 sent Ethernet packet 90. Sequence number section 100 contains information indicating what position Ethernet packet 90 occupies relative to the other Ethernet packets 90 that a given device is sending. Data length section 102 contains information indicating the amount of audio information in data segment 94. Data segment 94 includes data section 108, which contains the audio information that represents the audible sounds. Alternatively, data segment 94 may contain information representing a command.

In the disclosed embodiment, the telephones 30–32 and gateway 24 use a plurality of Ethernet packets 90 to exchange audio information, and hence audible sounds, with each other. Accordingly, Ethernet packet 90 is an electrical communication of audio information in a digital format that represents an audible sound. The size of data section 108 in each Ethernet packet 90 is variable from packet to packet. Thus, some Ethernet packets 90 may have only several bits of audio information, while other Ethernet packets 90 may have hundreds of bytes, or more, of audio information. Generally, small Ethernet packets will sometimes traverse communication network 20 faster than large Ethernet packets. However, breaking large Ethernet packets down into small Ethernet packets results in the use of more bandwidth on communication network 20, for example, because of the additional header segments 92 due to the additional Ethernet packets.

Figure 3:
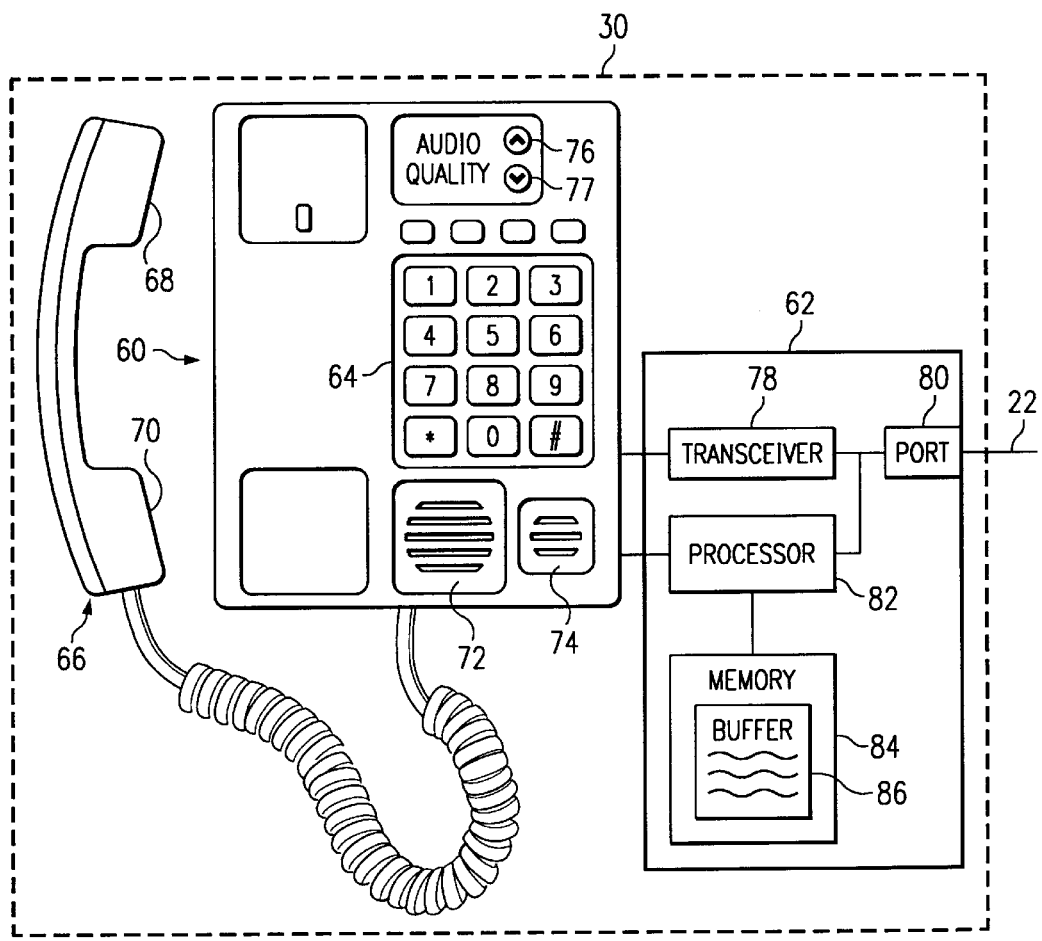
FIG. 3 is a diagrammatic view of a telephone which is a component of the embodiment of FIG. 1.

FIG. 3 is a diagrammatic view of the telephone 30 of FIG. 1. Telephones 31–32 are identical to telephone 30 in this embodiment and, thus, FIG. 3 is an accurate depiction of them also. As shown in FIG. 3, telephone 30 includes an external portion 60 and an internal portion 62. External portion 60 includes dialing buttons 64, such as those found on a standard telephone. External portion 60 also includes a handset 66. Handset 66 includes a speaker 68, which is a type of audio output device, and a microphone 70, which is a type of audio input device. Speaker 68 can assist in generating audible sounds based on the audio information in Ethernet packets 90 received from communication network 20. Microphone 70, on the other hand, can assist in receiving audible sounds and converting them into electrical communications of audio information, i.e., Ethernet packets 90, for communication network 20. External portion 60 further includes a speaker 72 and a microphone 74, which are mounted on external portion 60. Speaker 72 and microphone 74 function similarly to speaker 68 and microphone 70, but allow a user of telephone 30 to have "hands free" operation during audio communications. External portion 60 also includes buttons 76–77, which are a type of user operable input device. Buttons 76–77 allow a user of telephone 30 to indicate a desire to change an audio quality of the audible sound from either speaker 68 or speaker 72. In particular, button 76 allows the user of telephone 30 to indicate a desire to increase an audio quality of the audible sound, and button 77 allows the user to indicate a desire to decrease the audio quality of the audible sound. In other embodiments, buttons 76–77 could be replaced by a voice recognition system. Thus, the user of telephone 30 could speak verbal commands to which telephone 30 would respond, such as commands to increase or decrease the audio quality of audible sound.

Internal portion 62 contains the circuitry and devices for exchanging electrical communications of audio information with other telephones 31–32 and gateway 24, and for changing an audio quality of the audible sound generated at speaker 68 and/or 72. Internal portion 62 includes a transceiver 78, a communication port 80, a processor 82, and a memory 84. Processor 82 sends and receives electrical communications of audio information on communication network 20 through communication port 80, which is a known RJ-45 port for the disclosed embodiment. Between communication port 80 and communication network 20, the electrical communications travel through one of the communication links 22. Processor 82 also works in conjunction with transceiver 78 to send and receive electrical signals that represent audible sounds to and from handset 66.

In order to facilitate a better understanding of the present invention, a brief explanation of the operation of telephone 30 during an exchange of electrical communications of audio information with telephone 31 will now be given. When processor 82 of telephone 30 receives Ethernet packet 90 through communication port 80 from telephone 31, processor 82 converts this electrical communication of audio information into a format that is appropriate for transceiver 78. Basically, this involves removing header segment 92 and the Ethernet format from the audio information in data section 108. Processor 82 then sends the reformatted audio information to transceiver 78. Transceiver 78 then transforms the digital communication into an analog electrical signal that is appropriate for speaker 68 based on the audio information in the digital communication. Speaker 68, in turn, receives the analog electrical signal from transceiver 78 and generates an audible sound and/or sounds based on the electrical signal. On the other hand, when microphone 70 receives an audible sound and/or sounds, microphone 70 converts the audible sound into an analog electrical signal and sends it to transceiver 78. Transceiver 78, in turn, transforms the analog electrical signal into a digital communication appropriate for processor 82. Processor 82 then transforms this digital communication into one or more Ethernet packets 90. The number of Ethernet packets 90 that processor 82 will generate depends on the amount of audio information required to represent the audible sound and the size of data section 108 in each Ethernet packet 90. Processor 82 of telephone 30 then sends Ethernet packets 90 to telephone 31 through communication port 80 and communication network 20.

For the disclosed embodiment, processor 82 can also change the continuity of the audible sounds, an audio quality, generated by speaker 68 in response to the activation of buttons 76–77. At the beginning of an audio exchange, Ethernet packets 90 received by processor 82 each contain thirty milliseconds of audio information in data section 108. Processor 82 performs its conversion and sends the digital communication to transceiver 78 as it receives each Ethernet packet 90. Transceiver 78 then performs its transformation and sends an analog electrical signal representing the thirty milliseconds of audio information to speaker 68. Then, as the final sounds represented by the audio information in Ethernet packet 90 are being generated by speaker 68, another Ethernet packet 90 containing the next 30 milliseconds of audio information arrives at processor 82. This Ethernet packet 90 is processed in the same manner as the previous one. A problem arises, however, if subsequent Ethernet packet 90 arrives late enough so that a user of telephone 30 notices a time gap between the audible sounds generated from the audible information in these two successive Ethernet packets 90.

A brief explanation of the process by which a user of telephone 30 can control audio quality will now be given. In this explanation, telephone 30 will be treated as receiving Ethernet packets 90 from telephone 31. However, it will be understood that telephone 30 could simultaneously be sending similar Ethernet packets 90 to telephone 31.

Both processor 82 and memory 84 in telephone 30 play a role when the quality of the audible sound from speaker 68 is to be changed. When this audio quality is to be increased, processor 82 will detect manual activation of button 76. When processor 82 detects this activation, processor 82 has two options. First, processor 82 can facilitate a change in the quality by generating a signal, an Ethernet packet with a command, that specifies a decrease in the amount of audio information in each Ethernet packet 90 from telephone 31, and by sending this signal to telephone 31 through communication network 20. Decreasing the amount of audio information in each message unit is also known in the art as decreasing the latency time between message units. This process will cause telephone 31 to decrease the amount of audio information in data section 108 in future Ethernet packets 90 sent by telephone 31, thereby potentially decreasing the time it takes for those Ethernet packets 90 to traverse communication network 20 to telephone 30, at least in some instances. Thus, any latencies between the receipt of Ethernet packets 90 is decreased, increasing the continuity between the audible sounds generated by telephone 30 from successive Ethernet packets 90. Moreover, by using smaller amounts of data in each packet, each packet represents a smaller time segment of audible sound, and thus a delay in receipt of one packet is less likely to be noticeable by a human ear listening to the associated audible sound.

When telephone 30 first begins an audio exchange with telephone 31, telephone 30 is receiving thirty milliseconds worth of audio information in each Ethernet packet 90. Processor 82 knows how much audio information is in each Ethernet packet 90 because it is in communication with telephone 31 through the RTP signaling technique. Processor 82 will then generate successive signals (commands) to telephone 31, requesting that telephone 31 decrease the amount of audio information to twenty milliseconds, to ten milliseconds, and to five milliseconds with respective activations of button 76. Representing five milliseconds of audible sound with audio information in Ethernet packet 90 is supported by the G711 protocol, which is an industry standard protocol.

The second option available to processor 82 is to store the audio information from data sections 108 of two or more successive Ethernet packets 90 in a buffer 86 in memory 84 before beginning to send them to transceiver 78. This will allow processor 82 to meter out the audio information from successive Ethernet packets 90 to transceiver 78 at an even rate so that the audible sounds generated by speaker 68 will occur in a substantially continuous manner for all successive Ethernet packets 90.

When telephone 30 first begins an audio exchange with telephone 31, telephone 30 does not store the audio information from multiple Ethernet packets 90 in buffer 86, because processor 82 processes each Ethernet packet 90 as soon as it is received and immediately sends the reformatted audio information to transceiver 78. As processor 82 detects successive activations of button 76, however, processor 82 will progressively increase the number of stored data sections 108 by one for each activation of button 76, up to a maximum number of seven.

In the disclosed embodiment, telephones 30–32 can also exchange electrical communications of audio information with PSTN telephone 50 while still retaining the capability to change the quality of the audible sounds received from PSTN telephone 50. To facilitate an understanding of how this can occur, a brief discussion of the operations undertaken in an exchange of electrical communications between PSTN telephone 50 and telephone 30 will now be given. PSTN telephone 50 communicates an audible sound to telephone 30 by first receiving the audible sound. PSTN telephone 50 then converts the audible sound into an electrical signal and sends the electrical signal to PSTN 40 through PSTN link 43. PSTN 40 then routes the electrical signal to gateway 24 through PSTN link 42. Upon receiving the electrical signal, gateway 24 transforms the electrical signal into one or more Ethernet packets 90. Once converted into Ethernet packets 90, gateway 24 sends the Ethernet packets 90 to communication network 20 through one of the communication links 22.

Communication network 20 then routes these Ethernet packets 90 to telephone 30 through one of the communication links 22. Upon receiving each Ethernet packet 90, telephone 30 performs its previously discussed operations for generating an audible sound with speaker 68. On the other hand, when telephone 30 wants to send an audible sound to PSTN telephone 50, telephone 30 again performs its previously discussed operations to represent the audible sound by audio information in one or more Ethernet packets 90. Telephone 30 then sends Ethernet packets 90 to gateway 24 through communication network 20. Gateway 24 converts Ethernet packets 90 into an electrical signal appropriate for PSTN 40 and sends the electrical signal to PSTN 40, which routes it to PSTN telephone 50.

Gateway 24, therefore, acts as an intermediary between telephone 30 and PSTN telephone 50, allowing telephone 30 to operate in the same manner as if it was exchanging electrical communications of audio information with telephone 31, even though it is exchanging them with PSTN telephone 50. Moreover, even when telephone 30 is exchanging electrical communications of audio information with PSTN telephone 50, changing the quality of audible sound is possible because telephone 30 can signal gateway 24 to decrease the size of data segments 94 of Ethernet packets 90, thus decreasing the size of Ethernet packets 90 and potentially their transit time through communication network 20. Furthermore, even if gateway 24 does not have this capability, telephone 30 can still change the quality of audible sound by buffering data segments 94 of Ethernet packets 90.

Figure 4:
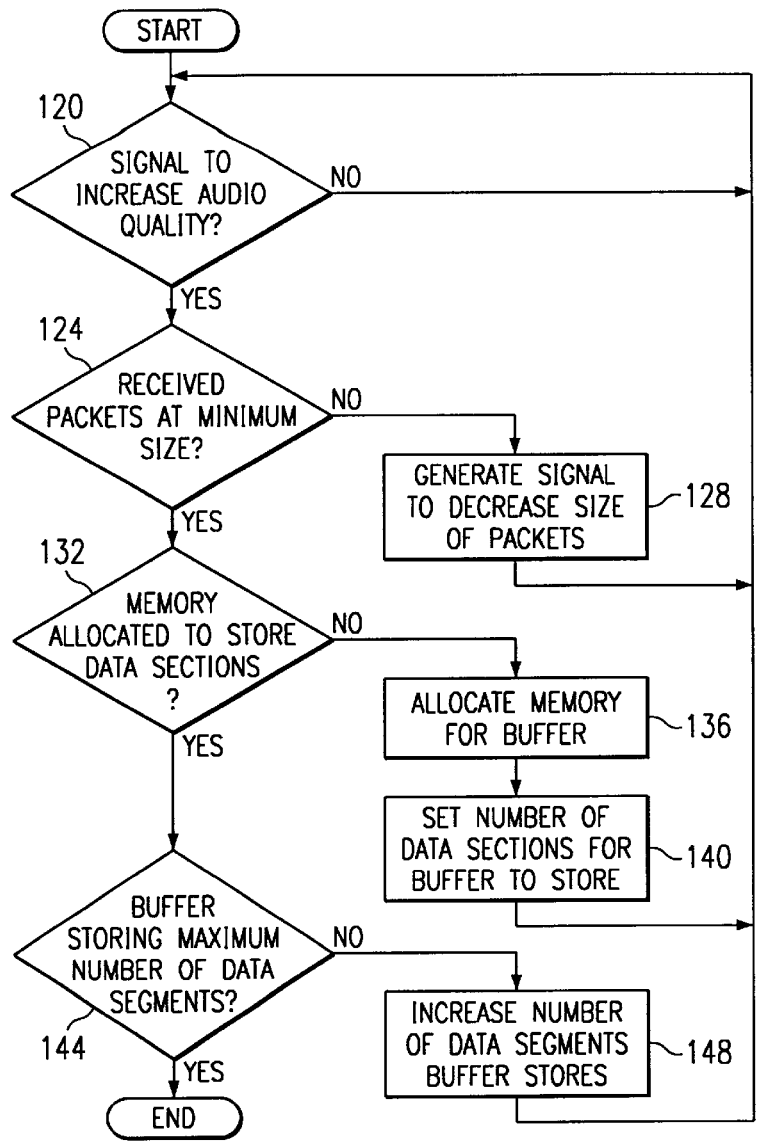
FIG. 4 is a flowchart that represents the operations which the telephone of FIGS. 1 and 3 undertakes in order to increase the quality of audible sound generated by the telephone.

FIG. 4 is a flowchart that represents the operations that processor 82 of telephone 30 undertakes to increase the quality of the audible sound generated by speaker 68 in the disclosed embodiment. First, processor 82 determines whether there is a signal from button 76 to increase this audio quality at block 120. If processor 82 does not detect such a signal at block 120, processor 82 continues in its current mode of processing Ethernet packets 90. If, however, processor 82 does detect such a signal at block 120, processor 82 then determines at block 124 whether the Ethernet packets 90 that it is currently receiving through communication port 80 are of minimum size, or in other words contain audio information representing five milliseconds worth of audible sound. If Ethernet packets 90 are not of minimum size at block 124, processor 82 generates at block 128 an Ethernet packet with a command that specifies a decrease in the amount of audio information in future Ethernet packets 90. The Ethernet packet with the command travels through communication port 80 to telephone 31, which will decrease the amount of audio information in future Ethernet packets 90 in a manner described later. After block 128, processor 82 returns to normal processing of packets, until it receives another signal to increase the quality of the audible sound.

If, however, Ethernet packets 90 that telephone 30 is currently receiving are of minimum size at block 124, processor 82 then determines at block 132 whether any of memory 84 has been allocated to store data sections 108 of Ethernet packets 90. If none of memory 84 has been allocated for storing the audio information at block 132, processor 82 allocates a portion of memory 84 as buffer 86 at block 136. Buffer 86 can store the audio information for up to seven data sections 108 in the disclosed embodiment. Processor 82 then sets, at block 140, a number of data sections 108 to be stored in buffer 86 before beginning to send the audio information from data sections 108 to transceiver 78. After block 140, processor 82 returns to normal processing of packets, until it receives another signal to increase the audio quality.

If, however, it is determined at block 132 that memory 84 has been allocated for buffer 86, processor 82 determines at block 144 whether buffer 86 is already storing the audio information for the maximum number of data sections 108. If processor 82 determines at block 144 that buffer 86 is storing the audio information for the maximum number of data sections 108, then the process for increasing this audio quality is at an end. If, however, buffer 86 is not found to be storing the audio information for the maximum number of data sections 108 at block 144, then processor 82, at block 148, increases the number of data sections 108 that buffer 86 will store. Processor 82 then waits for another signal to increase this audio quality.

Figure 5:
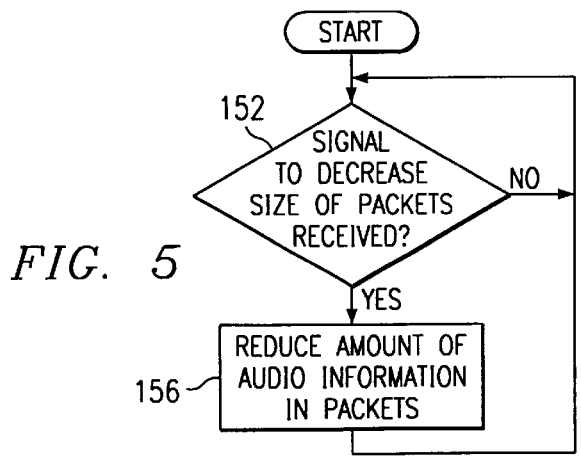
FIG. 5 is a flowchart that represents the operations that another telephone of FIG. 1 undertakes in order to increase the quality of audible sound generated by the telephone of FIG. 3.

FIG. 5 is a flowchart that represents the operations of telephone 31 for increasing the quality of the audible sound generated by telephone 30. As previously discussed in association with FIG. 4, if processor 82 of telephone 30 determines at block 124 that Ethernet packets 90 currently being received are not of a minimum size, processor 82 generates an Ethernet packet with a command to decrease the size of future Ethernet packets 90 at block 128. This signal is then sent through communication network 20 to telephone 31. At block 152, telephone 31 determines whether it has received a signal in the form of an Ethernet packet with the command to decrease the size of future Ethernet packets 90. If telephone 31 does not detect the signal at block 152, telephone 31 waits to receive the signal, while doing other normal processing. If, however, telephone 31 does detect the signal to decrease the size of future Ethernet packets 90 at block 152, then at block 156 telephone 31 reduces the amount of audio information in data section 108 of Ethernet packets 90 that it sends to telephone 30 in the future. This reduces the size of Ethernet packets 90 and potentially increases the rate at which Ethernet packets 90 travel through communication network 20.

Although the operations of telephone 30 have been discussed with FIGS. 4 and 5 in relation to increasing the continuity between the audible sounds generated from a series of Ethernet packets 90, processor 82 could also change other audio qualities of the audible sound. For instance, processor 82 could decrease the continuity between the audible sounds generated from a series of Ethernet packets 90 by generating a signal to increase the size of future Ethernet packets 90 or by buffering the audio information from fewer Ethernet packets 90. As other examples, processor 82 could change the pitch of the audible sounds or filter the audible sounds. A variety of other possibilities also exist.

The present invention provides a number of technical advantages. One such technical advantage is the ability of each communication device to change, or at least facilitate a change, in an audio quality of the audible sound generated by the communication device in response to user input. For example, as described above for the disclosed embodiment, a telephone can respond to a user request to change the quality of the audible sound generated by the telephone. Thus, the user of the communication device can control the audio quality of the audible sound generated by the communication device.

A further technical advantage is that a single communication device may have more than one way to improve the quality of the audible sound. In the disclosed embodiment, for example, one technique involves facilitating a decrease in the amount of audio information in each Ethernet packet, which decreases the size of the Ethernet packet, allowing the Ethernet packets to potentially travel across the communication network in less time, and also decreasing the audible impact of any single delayed packet. A second technique in the disclosed embodiment involves buffering the audio information of one or more Ethernet packets. By buffering the audio information of Ethernet packets, the processor can ensure that audio information is metered out at a more even rate for purposes of generating audible sound. Both of these techniques allow a user of the communication device to hear a smoother stream of audible sounds.

Yet another technical advantage is that a communication device need not lose the ability to change the audio quality of audible sounds when it is exchanging audible sounds with a PSTN communication device. In the described embodiment, for example, when the PSTN telephone sends an electrical signal that represents an audible sound to a telephone, the gateway converts the electrical signal into one or more Ethernet packets and communicates them to the telephone. Accordingly, if the gateway is properly configured, the telephone can command the gateway to change the amount of audio information in the Ethernet packets that the gateway is generating. Thus, the telephone can perform all of its previously discussed operations for changing the audio quality of audible sound generated by the telephone.

Although a particular embodiment has been illustrated and described in detail, it should be understood that various substitutions and alterations can be made thereto without departing from the scope of the present invention. For example, although telephones have been used to illustrate devices that communicate audio information through the communication network in the disclosed embodiment, a variety of other devices can perform a similar function, such as personal computers that are equipped to receive and generate audible sounds, digital cellular phones, or any other device that is equipped to receive digital communications and convert them into audible sounds and receive audible sounds and convert them into digital communications. Moreover, although a user of the communication device indicates a desire to change the audio quality by activating a button in the described embodiment, a variety of other activation mechanisms exist, such as voice, heat, or any other means by which a user input can be detected by an electronic device.

As another example, although the communication network has been described as an Ethernet network, it could also be any other type of packet switched network in which the electrical communications would be packaged in discrete message units. Moreover, the communication network could be any other type of digital network, whether the electrical communications would be packaged in discrete message units or not. In addition, the communication network could be an analog network.

Yet another example is that the processor in the telephone in the disclosed embodiment does not have to use the process illustrated in FIG. 4 for improving the quality of the audible sound generated by the communication device. For example, one possible variation is that the processor may only generate signals to decrease the amount of audio information in future Ethernet packets, without buffering the audio information. A second possible variation is that the processor may only buffer the audio information in the Ethernet packets to increase the audio quality, without decreasing the amount of information in the Ethernet packets. A third possible variation is that the processor may first buffer the audio information in the Ethernet packets, and then, after the full buffer capacity is in use, generate an Ethernet packet with a command to decrease the amount of audio information in future Ethernet packets. Other substitutions and alterations are also possible without departing from the spirit and scope of the present invention, as defined by the following claims.

What is claimed is:

1. A method, comprising:
   receiving in a telephone electrical communications of audio information in a plurality of message units that are in a digital format;
   generating audible sound based on said audio information in each of said message units;
   detecting a user request for a change in a latency in said audible sound; and
   responding to detection of said request by generating a signal to change the amount of said audio information in each of said message units.

2. The method of claim 1, wherein said electrical communications of said audio information in a digital format are packaged in discrete message units.

3. The method of claim 2, wherein said message units are Ethernet packets.

4. The method of claim 2, wherein said step of responding includes storing audio information of at least two of said message units before generating audible sound based on said stored audio information.

5. The method of claim 1, wherein said step of responding includes storing said audio information of at least two of said message units before generating audible sound based on said stored audio information.

6. The method of claim 1, wherein responding to said request comprises:
   determining whether a first technique of facilitating said requested change has been utilized to a predetermined degree;
   utilizing said first technique if said first technique is determined to have been utilized less than said predetermined degree; and
   utilizing a second technique of facilitating said requested change if said first technique is determined to have been utilized to said predetermined degree, said second technique being different from said first technique.

7. An apparatus comprising a telephone which includes:
   a network interface that includes a network coupling portion that can be coupled to a communication network, said network interface being operable to receive through said coupling portion message units that contain audio information in a digital format;
   a user operable input portion; and
   circuitry coupled to said network interface and said input portion, said circuitry being operable to generate audible sound that corresponds to said audio information in said received message units, and being operable to facilitate a change in a latency in said audible sound in response to operation of said input portion by sending through said coupling portion a signal to change the amount of said audio information in each of said message units.

8. The apparatus of claim 7, wherein said network coupling portion is adapted to couple to an Ethernet network.

9. The apparatus of claim 7, wherein said circuitry includes a memory, said memory being operable to store said audio information of one of said message units.

10. The apparatus of claim 9, wherein said circuitry facilitates said change in said latency in said audible sound by storing said audio information of at least two of said message units in said memory before generating audible sound that corresponds to said stored audio information.

11. The apparatus of claim 7, including:
    a communication network coupled to said network coupling portion; and
    a further telephone coupled to said communication network, said further telephone comprising:
        a further network interface that includes a further coupling portion coupled to said communication network; and
        further circuitry coupled to said further network interface, said further circuitry being operable to send through said further coupling portion message units that contain audio information in a digital format, to receive through said further coupling portion said signal to change said latency in said audible sound, and to facilitate said change in said latency in said audible sound in response to said signal to change said latency by modifying the audio information in said message units.

12. The apparatus of claim 11, wherein said further circuitry of said further telephone facilitates said change in said latency by changing the amount of said audio information in each of said message units sent by said further telephone.

13. An apparatus comprising an audio communication device which includes:
    a processor;
    a transceiver coupled to said processor, said transceiver being operable to receive and send electrical communications of audio information in a plurality of message units;
    an audio input device coupled to said transceiver, said audio input device being operable to receive audible sound and convert it into electrical communications;
    an audio output device coupled to said transceiver, said audio output device being operable to generate audible sound based on said audio information in each of said message units in received electrical communications; and
    a user operable input device coupled to said processor, said input device being operable to instruct said processor to facilitate a change in a latency in said audible sound from said audio output device by generating a signal to change the amount of said audio information in each of said message units.

14. The apparatus of claim 13, wherein said electrical communications of audio information are in a digital format and packaged in discrete message units.

15. The apparatus of claim 14, wherein said message units are Ethernet packets.

16. The apparatus of claim 14, further including a memory coupled to said processor, said memory being operable to store said audio information of one of said message units.

17. The apparatus of claim 16, wherein said processor facilitates said change in said latency in said audible sound by causing said memory to store said audio information of at least two of said message units before said audible output device generates said audible sound based on said stored audio information.

18. The apparatus of claim 13, wherein said audio communication device is a telephone.

19. The apparatus of claim 13, wherein the processor is operable to facilitate the requested change by:
  determining whether a first technique of facilitating said requested change has been utilized to a predetermined degree;
  utilizing said first technique if said first technique is determined to have been utilized less than said predetermined degree; and
  utilizing a second technique of facilitating said requested change if said first technique is determined to have been utilized to said predetermined degree, said second technique being different from said first technique.

20. A computer-readable medium encoded with a computer program which is operable when executed by a processor in a telephone to:
  receive electrical communications of audio information in a plurality of message units that are in a digital format;
  facilitate the generation of audible sound based on said audio information in each of said message units;
  detect an indication of a user request for a change in a latency in said audible sound; and
  respond to detection of said user request by generating a signal to change the amount of said audio information in each of said message units.

21. A computer-readable medium according to claim 20, wherein said computer program is operable to carry out said facilitating of said requested change by:
  determining whether a first technique of facilitating said requested change has been utilized to a predetermined degree;
  utilizing said first technique if said first technique is determined to have been utilized less than said predetermined degree; and
  utilizing a second technique of facilitating said requested change if said first technique is determined to have been utilized to said predetermined degree, said second technique being different from said first technique.

22. The computer readable medium of claim 20, wherein said electrical communications of audio information in a digital format are packaged in discrete message units.

23. The computer readable medium of claim 20, wherein said message units comprise Ethernet packets.

24. The computer readable medium of claim 20, wherein the medium is operable to respond by storing said audio information of at least two of said message units before generating audible sound based on said stored audio information.

25. The computer readable medium of claim 20, wherein the medium is operable to respond by storing audio information of at least two of said message units before generating audible sound based on said stored audio information.

26. An apparatus, comprising a telephone which includes:
  means for receiving electrical communications of audio information in a plurality of message units that are in a digital format;
  means for generating audible sound based on said audio information in each of said message units;
  means for detecting a user request for a change in a latency in said audible sound; and
  means for responding to detection of said request by sending through said coupling portion a signal to change the amount of said audio information in each of said message units.

27. The apparatus of claim 26,
  wherein said means for generating audible sound includes a memory operable to store said audio information of at lease one of said message units; and
  wherein said means for facilitating said change in latency facilitates said change in said latency by storing said audio information of at least two of said message units in said memory before generating audible sound that corresponds to said stored audio information.

28. The apparatus of claim 26,
  wherein said means for generating audible sound includes a memory operable to store said audio information of at least one of said message units.

29. A method, comprising:
  receiving electrical communications of audio information in a plurality of message units that are in a digital format;
  generating audible sound based on the audio information in each of said message units;
  detecting a user request for a change in a latency of the audible sound; and
  responding to detection of the request by generating a signal to change the amount of the audio information in each of the message units.

30. The method of claim 29, wherein the electrical communications of the audio information in a digital format are packaged in discrete message units.

31. The method of claim 30, wherein the message units are Ethernet packets.

32. The method of claim 30, wherein the step of responding further includes storing audio information of at least two of the message units before generating audible sound based on the stored audio information.

33. The method of claim 30, wherein the step of responding further includes storing the audio information of at least two of the message units before generating audible sound based on the stored audio information.

34. An apparatus comprising:
  a network interface that includes a network coupling portion that can be coupled to a communication network, the network interface being operable to receive through the coupling portion message units that contain audio information in a digital format;
  a user operable input portion; and
  circuitry coupled to the network interface and the input portion, the circuitry being operable to generate audible sound that corresponds to the audio information in the received message units, and being operable to facilitate a change in a latency of the audible sound by sending through the coupling portion a signal to change the amount of the audio information in each of the message units in response to operation of the input portion.

35. The apparatus of claim 34, wherein the network coupling portion is adapted to couple to an Ethernet network.

36. The apparatus of claim 34, wherein the circuitry includes a memory, the memory being operable to store the audio information of one of the message units.

37. The apparatus of claim 36, wherein the circuitry is further operable to facilitate the change in the latency of the audible sound by storing the audio information of at least two of the message units in the memory before generating audible sound that corresponds to the stored audio information.

38. The apparatus of claim 34, further including:
a communication network coupled to the network coupling portion; and
a further apparatus coupled to the communication network, the further apparatus comprising:
  a further network interface that includes a further coupling portion coupled to the communication network; and
  further circuitry coupled to the further network interface, the further circuitry being operable to send through the further coupling portion message units that contain audio information in a digital format, to receive through the further coupling portion the signal to change the latency of the audible sound, and to facilitate the change in the latency of the audible sound in response to the signal to change the latency by modifying the audio information in the message units.

39. The apparatus of claim 34, wherein the further circuitry of the further apparatus facilitates the change in the latency by changing the amount of the audio information in each of the message units sent by the further apparatus.

40. An audio communication device comprising:
a processor;
a transceiver coupled to the processor, the transceiver being operable to receive and send electrical communications of audio information in a plurality of message units;
an audio input device coupled to the transceiver, the audio input device being operable to receive audible sound and convert it into electrical communications;
an audio output device coupled to the transceiver, the audio output device being operable to generate audible sound based on the audio information in each of said message units; and
a user operable input device coupled to the processor, the input device being operable to instruct the processor to facilitate a change in a latency of the audible sound from the audio output device by generating a signal to change the amount of the audio information in each of the message units.

41. The audio communication device of claim 40, wherein the electrical communications of audio information are in a digital format and packaged in discrete message units.

42. The audio communication device of claim 41, wherein the message units are Ethernet packets.

43. The audio communication device of claim 41, further including a memory coupled to the processor, the memory being operable to store the audio information of one of the message units.

44. The audio communication device of claim 43, wherein the processor is further operable to facilitate the change in the latency of the audible sound by causing the memory to store the audio information of at least two of the message units before the audible output device generates the audible sound based on the stored audio information.

45. A computer program stored on a computer readable medium, the computer program operable to:
receive electrical communications of audio information in a plurality of message units that are in a digital format;
facilitate the generation of audible sound based on the audio information in each of said message units;
detect an indication of a user request for a change in latency of the audible sound; and
respond to detection of the user request by facilitating the requested change in the latency of the audible sound by generating a signal to change the amount of the audio information.

46. The computer program of claim 45, wherein the electrical communications of the audio information in a digital format are packaged in discrete message units.

47. The computer program of claim 46, wherein the message units are Ethernet packets.

48. The computer program of claim 46, wherein the computer program is further operable to respond to detection of the user request by storing audio information of at least two of the message units before generating audible sound based on the stored audio information.

49. An apparatus comprising:
means for receiving electrical communications of audio information in each of said message units that are in a digital format;
means for generating audible sound based on the audio information;
means for detecting a user request for a change in a latency of the audible sound; and
means for responding to detection of the request by generating a signal to change the amount of the audio information in each of the message units.

* * * * *

UNITED STATES PATENT AND TRADEMARK OFFICE
CERTIFICATE OF CORRECTION

PATENT NO. : 6,785,234 B1
DATED : August 31, 2004
INVENTOR(S) : Kenneth P. Pruski It is certified that error appears in the above-identified patent and that said Letters Patent is hereby corrected as shown below:

Column 12,
Line 21, delete "lease", and insert -- least --.

Column 14,
Line 26, insert -- a -- before "latency".
Line 44, after the first "in", delete "each of said", and insert -- a plurality of --.
Line 47, after "information", delete ";", and insert -- in each of said message units; --.

Signed and Sealed this

Twenty-fifth Day of January, 2005

JON W. DUDAS
*Director of the United States Patent and Trademark Office*